United States Patent
Gotshall

[15] 3,699,216
[45] Oct. 17, 1972

[54] FINELY DIVIDED CARBON AND THE PREPARATION THEREOF

[72] Inventor: William W. Gotshall, Orchard Lake, Mich.

[73] Assignee: Marathon Oil Company, Findlay, Ohio

[22] Filed: Aug. 10, 1970

[21] Appl. No.: 62,688

Related U.S. Application Data

[63] Continuation-in-part of Ser. No. 666,011, Sept. 7, 1967, abandoned.

[52] U.S. Cl. .................423/449, 106/307, 260/37, 260/41.5
[51] Int. Cl. .......................C01b 31/02, C09c 1/44
[58] Field of Search ..........23/209.1, 209.2; 106/307; 260/41.5; 241/15, 16, 30

[56] References Cited

UNITED STATES PATENTS

| | | | |
|---|---|---|---|
| 2,066,274 | 12/1936 | Grote | 23/209.1 |
| 3,024,092 | 3/1962 | Gessler | 23/209.2 |
| 3,333,979 | 8/1967 | Milligan | 106/307 |
| 3,391,103 | 7/1968 | Mueller | 23/209.1 X |

OTHER PUBLICATIONS

Bremner et al., " Trans. Inst. Rubber Ind.," Vol. 24, 1948, pp. 35– 51.

*Primary Examiner*—Edward J. Meros
*Attorney*—Joseph C. Herring and Richard C. Willson, Jr.

[57] ABSTRACT

The present invention comprises a finely divided carbon suitable for compounding with polymeric materials to form intermediate strength, intermediate modulus compositions, said form of carbon being prepared by a process comprising the steps of comminuting coke and contacting it with methanol, either during or after comminution and related processes.

The compositions of the present invention are useful as fillers and reinforcing agents for a wide variety of polymeric materials including natural rubber, butyl rubber, nylons, methylmethacryalates, epoxies, polyurethanes, etc. The compositions of the present invention are especially preferred for use in vulcanizable rubber compositions because of their ability to materially shorten the relative length of time required to cure such compositions to maximum tensile strength.

10 Claims, 1 Drawing Figure

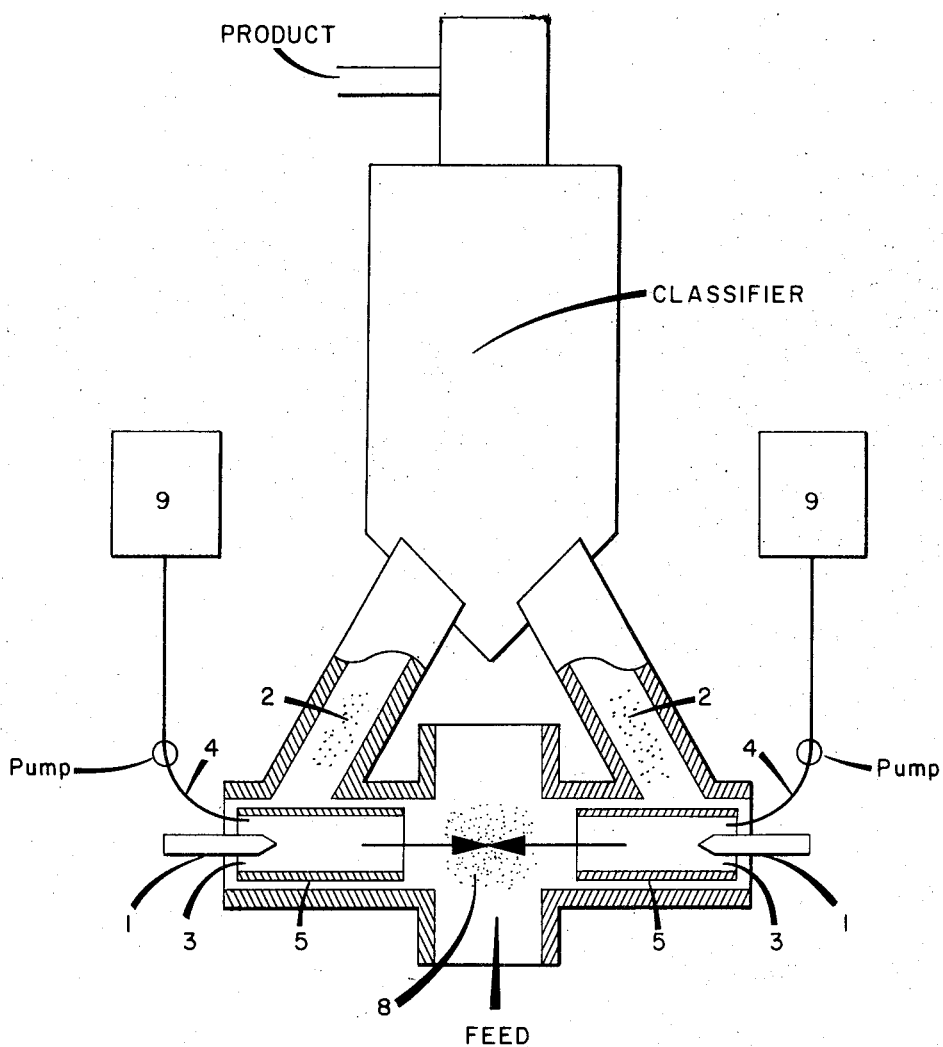

FINELY DIVIDED CARBON AND THE PREPARATION THEREOF

CROSS REFERENCE TO RELATED APPLICATIONS

The present application is a continuation-in-part of Ser. No. 666,011 filed Sept. 7, 1967, now abandoned.

The following applications generally relate to the grinding of coke and other compounds for use as fillers in polymeric compositions: Ser. No. 437,285 filed Mar. 4, 1965, Now U.S. Pat. No. 3,404,019; Ser. No. 476,504 filed Aug. 2, 1965, now U.S. Pat. No. 3,493,532; and Ser. No. 476,747 filed Aug. 2, 1965, now U.S. Pat. No. 3,404,120. Inventor in each of these applications is William W. Gotshall and each of these applications is assigned to the assignee of the present invention.

BACKGROUND OF THE INVENTION

1. Field of the Invention

For many years, carbon has found widespread uses as a filler in plastic, and particularly in rubber compositions. Because they permit the attainment of high tensile strength, carbon blacks have been the preferred fillers and additives in such compositions. Carbon blacks include among others, acetylenic blacks, channel blacks, thermal blacks, and furnace blacks. Most of these are produced by the combustion of gases such as acetylene or natural gas, or of liquid petroleum products such as crude oils. Such processes involving incomplete combustion under carefully controlled conditions, followed by a collection step, as by scraping the carbon blacks from a surface on which they have been deposited. Because of the capital investment requirements, close control, relatively expensive raw materials, and especially low yields encountered in the production of carbon blacks, their prices are relatively high and plants for their production are virtually always located near sources of raw materials.

2. Description of the Prior Art

The above-mentioned applications of the present inventor describe carbon products which are all derived from cokes, preferably petroleum cokes and most preferably from fluid petroleum cokes. Unlike ground metallurgical cokes, which are sometimes used as fillers and extenders in low cost rubber products, the carbon products of the above applications provide modulae, sets, and tensile strength in the form of finished formulations which are relatively near the level of those obtained by the use of good quality carbon blacks, and very superior staining properties.

SUMMARY

The present invention provides materials which can be used to formulate polymeric compositions having relatively good modulae, sets, and tensile strengths. These carbon products of the present invention are provided by a process which comprises comminuting coke, preferably petroleum coke, and most preferably fluid petroleum coke, while the coke is maintained in contact with methanol $CH_3OH$. The average coke particle size is preferably below about 2.5 microns.

It has been discovered that by grinding coke while in contact with methanol the resulting ground product can be formulated into polymeric formulations, especially vulcanizable rubber compositions and therein provides the desirable property of relatively fast cure as illustrated by the Examples which follow. Further, it has been discovered that this reduction in the time required to cure to optimum tensile strength is obtained whether or not the carbon has been ground in an oxidizing or in a non-oxidizing atmosphere. Grinding in a non-oxidizing atmosphere and subsequent protection from oxidation according to the methods of the aforementioned applications is preferred in order to obtain best tensile, modulus, and other properties, but is not necessary to obtain the reduced cure time of the present invention.

In addition to the advantage of reduced cure time, the present invention provides in most formulations increased elongation and decreased modulus and further a reduction in heat rise as measured by the Goodrich Flexometer. The lower modulus permits a higher loading of the carbon products of the present invention into rubber formulations to be used for tire carcasses, and simultaneously the lower heat rise provided by the present invention permits automobile tires to run cooler.

BRIEF DESCRIPTION OF THE DRAWING

The drawing shows fluid grinding apparatus used in preferred embodiments of the invention.

DESCRIPTION OF THE PREFERRED EMBODIMENTS

EXAMPLE I

In the preferred embodiment of the present invention, fluid petroleum coke produced according to the methods of A. Vorhies, Fluid Coking, Proceedings of the 4th World Petroleum Congress, Section III/F, page 360 and Petroleum Processing, March 1956, pages 135 – 137 is fitted to a model No. 30–10 mill manufactured by Majac, Inc., of Sharpsburg, Pennsylvania. Steam is utilized as the grinding fluid in a sonic velocity approximately at 700° to 800° F and 100 to 150 psig nozzle pressure is maintained throughout the grinding section of the mill. Referring to the drawing, the steam is introduced through the nozzle 1 and mixes with the coke 2 which has previously been ground to −10 mesh. Methanol 9 is introduced through a one-fourth inch copper tubing 4 which terminates at the mixing throat 3. About 2 pounds of methanol are added for each 100 pounds of coke fed to the mill. 4 pounds of 4065 AT aromatics (a mixture of primarily alkyl naphthalenes extracted from a light catalytic cycle oil and boiling between 400° and 650° F.) is added with the methanol. The mixture of coke, methanol, aromatics, and steam is then propelled through the acceleration nozzle 5.

A similar coke feeding system, methanol feeding system, and steam injection nozzle are located in mere image relationship to the above described system so that particles of coke from the two acceleration nozzles impinge upon each other at sonic velocities in the interior of the mill 8.

A conventional classifier on the mill is operated to separate out about 5 micron or smaller particles and grinding is continued until the size distribution of the particles is as follows: 99 percent less than 5 microns; 50 percent less than 1.5 microns; 10 percent less than 0.5 microns. (All percentages in the present application are percents by weight unless otherwise specified.)

In this embodiment, care is taken to exclude oxygen, and the water from the steam is prepared is deaerated prior to entering the steam boilers. The entire apparatus is lagged with insulation in order to minimize condensation of the walls of the mill.

The product is collected in totally filled sealed containers with minimal exposure to air. When the product prepared as described above is utilized in rubber compositions containing approximately 65 parts of the new product per 100 parts of natural rubber, the resulting composition is found to have a tensile strength comparable to the average tensile strength obtained when utilizing good quality carbon black such as medium thermal blacks and has significantly superior modulus and set.

While the fluid petroleum cokes are preferred for the practice of the present invention, delayed cokes including among others, those manufactured by the processes of U. S. Pat. No. 2,775,549, and even coal-derived cokes may be utilized with the present invention. In general, calcining to produce a coke of not more than about .7 percent volatiles is preferred prior to grinding.

EXAMPLE II

The procedures of Example I were followed, except that no methanol was added. Results (based upon optimum cure as determined by peak tensile strength) of the natural rubber compositions produced from the product of Examples I and II are shown in Table I.

TABLE I

| % Methanol During Grinding | Cure (min.) | Modulus at 300% Elongation | Tensile (p.s.i.) | Elongation % | Set | Shore Creep |
|---|---|---|---|---|---|---|
| EXAMPLE I | | | | | | |
| 1.0% | 10 | 1400 | 2300 | 450 | 18 | 56–54 |
| 1.0% | 15 | 1540 | 2250 | 420 | 14 | 58–56 |
| 1.0% | 30 | 1880 | 2150 | 350 | 11 | 60–59 |
| 1.0% | 50 | 1970 | 2070 | 313 | 9 | 62–60 |
| EXAMPLE II | | | | | | |
| 0 | 10 | 1330 | 1910 | 413 | 15 | 54–50 |
| 0 | 15 | 1420 | 2120 | 433 | 13 | 55–51 |
| 0 | 30 | 1810 | 2400 | 390 | 13 | 58–55 |
| 0 | 50 | 1900 | 2240 | 347 | 9 | 58–57 |

Inspection of Table I indicates that the cure time for optimum tensile strength was reduced from 30 to 10 minutes. This comparison and comparison of stress-strain results at these latter cures gives the following tabulated comparison:

Modulus was reduced 22.7 percent by addition of 1 percent methanol

Ultimate tensile strength was reduced 4.2 percent by addition of 1 percent methanol Ultimate elongation increased 15.4 percent by addition of 1 percent methanol Cure time was reduced 66 ⅔ percent by addition of 1 percent methanol

EXAMPLE III

To illustrate that the techniques of the present invention are advantageous even where the coke is ground under oxidizing conditions, two identical runs were made using the apparatus and procedures of Example I except that air at 80° F. was used in place of the superheated steam of Example I: 2 percent by weight of methanol was injected.

EXAMPLE IV

The apparatus and procedures of EXAMPLE III were followed except that no methanol or other coating was injected.

The results of Examples III and IV (based upon optimum cure as determined by peak tensile strength) are as tabulated in Table II:

TABLE II

| % Methanol During Grinding | Cure (min) | Modulus at 300% Elongation | Tensile (p.s.i.) | Elongation % | Set | Shore Creep |
|---|---|---|---|---|---|---|
| EXAMPLE III (ground in air with 2% methanol added) | | | | | | |
| 2 | 10 | 820 | 1500 | 495 | 27 | 28–41 |
| 2 | 30 | 1130 | 1960 | 455 | 14 | 56–53 |
| 2 | 50 | 1290 | 1890 | 417 | 12 | 58–56 |
| EXAMPLE IV (ground in air without methanol) | | | | | | |
| 0 | 10 | 830 | 1330 | 460 | 28 | 47–40 |
| 0 | 30 | 1220 | 1880 | 433 | 14 | 55–55 |
| 0 | 50 | 1330 | 1920 | 407 | 12 | 56–54 |

Comparison of the products of Examples III and IV as tabulated in Table II gives the following:

Modulus was reduced 15.1 percent by the addition of 2 percent methanol

Ultimate tensile strength was increased 2.1 percent by the addition of methanol

Ultimate Elongation was increased 11.8 percent by the addition of 2 percent methanol Cure time for optimum tensile strength was reduced 40 percent by the addition of 2 percent methanol.

It should be understood that although fluid grinding was utilized for each of the above Examples, other methods of comminution including conventional ball mills, bowl mills, or roller mills, particularly the type described in U.S. Pat. No. 3,027,103 to Mischauski may be employed without deviating from the spirit of the present invention.

EXAMPLE V

Coke is ground, using the apparatus, procedures and starting material of Example IV, grinding in steam with no methanol and no coating to protect from oxidation. After the coke is ground, a portion is set aside in a sealed can and tested and marked as "AS 87." The rest of the ground coke is placed into a stirred pot (the apparatus shown in "Rubber Age" June 1969 at p 61) into which air is circulated for a period of 3 hours at room temperature to oxidize the surface of the freshly ground carbon. This material, designated as "AS 87-3,'' is placed in a sealed can for compounding. Some of this "AS 87-3" that had been aged for 3 hours was then coated with 2 percent by weight with methanol and the excess methanol evaporated off and a sample of this material was then placed in a sealed can for compounding in rubber and called "AS 87-3M."

According to the procedures of the above examples, rubber compounds were formulated and tested using the following formula:

| | |
|---|---|
| SBR 1502 | 100 Parts by weight |
| Zinc oxide | 5.00 Parts by weight |
| Stearic acid | 2.00 Parts by weight |
| Surfur | 1.75 Parts by weight |
| Santocure | 1.30 Parts by weight |
| Carbon black | 65 Parts by weight |

From the rheometer curves drawn by a Monsanto rheometer, the optimum vulcanization time for the first material, AS 87, is found to be 32.5 minutes. After 3 hours exposure to air, AS 87-3 showed a vulcanization time of 38.5 minutes, or 6 minutes longer. After addition of 2 percent by weight of methanol AS 87-3M this same material that was oxidized for 3 hours shows an optimum vulcanization time of 32 minutes which is 6 ½ minutes less than the material before the methanol was added and is essentially the same as the material before oxidation. This is a 17 percent reduction in vulcanization time due to methanol treatment.

Rubber compounding in the above Examples was in all cases accomplished according to the ASTM specification tests for medium thermal blacks.

The above coating agents, techniques, and apparatus are, of course, merely illustrative and are not to be taken as limiting the invention.

In general the coating agent should allow easy dispersion of the carbon product during compounding. The coating agent must also be non-deleterious to the compositions in which the new form of coated carbon will be employed. A fugitive coating agent which evaporates or melts during processing, as for example, during the vulcanizing of rubber formulations, is particularly desirable. Melting or boiling points of from 70° to about 250° F. are preferred. In addition to the liquids, certain finely divided powders, e.g. zinc stearate, stearic acid, and solid primary amines will act as effective barriers against oxidizing atmospheres in preferred embodiments of the invention.

What is claimed is:

1. A process for the production of finely divided carbon suitable for compounding with polymeric materials to form intermediate strength, intermediate modulus compositions comprising comminuting coke to an average particle size below about 2.5 microns and contacting it with from about 0.1 to about 10 percent based on the weight of the coke, of methanol during or after said comminuting.

2. The process of claim 1 wherein the coke is comminuted in the presence of a non-oxidizing atmosphere comprising steam.

3. The process of claim 1 wherein the coke is comminuted in an atmosphere comprising nitrogen.

4. The process of claim 1 wherein the methanol comprises from about 0.5 to about 5 percent by weight based on the weight of the coke.

5. The process of claim 1 in which the methanol comprises from about 1 to about 2 percent based on the weight of the coke.

6. The process of claim 1 wherein the major portion of the communition is accomplished by fluid grinding.

7. A process a according to claim 1 wherein the coke is comminuted in the presence of methanol.

8. A process of claim 1 wherein the coke is comminuted in a non-oxidizing atmosphere.

9. The finely divided carbon product produced according to the process of claim 1.

10. The carbon product of claim 9 wherein the particles have been comminuted in a nonoxidizing atmosphere.

* * * * *